United States Patent [19]

Khoshnevisan et al.

[11] Patent Number: 4,960,322

[45] Date of Patent: Oct. 2, 1990

[54] KERR-BRAGG AGILE BEAM STEERING DEVICE

[75] Inventors: Mohsen Khoshnevisan, Newbury Park; Pochi A. Yeh, Thousand Oaks, both of Calif.

[73] Assignee: Rockwell International Corporation, El Segundo, Calif.

[21] Appl. No.: 289,632

[22] Filed: Dec. 23, 1988

[51] Int. Cl.⁵ ............................ G02F 1/11; G02F 5/23
[52] U.S. Cl. ....................................... 350/354; 350/358
[58] Field of Search ................................ 350/354, 358

[56] References Cited

U.S. PATENT DOCUMENTS

| 3,915,556 | 10/1975 | Roland et al. | 350/358 |
| 4,624,534 | 11/1986 | Amand | 350/358 |
| 4,660,206 | 4/1987 | Halmos et al. | 372/21 X |

OTHER PUBLICATIONS

Khoshnevisan et al., Relationship Between Nonlinear Electrostrictive Kerr Effects and Acousto-Optics, Proceedings of Society of Photooptical and Instrumentation Engineers O-E LASE '87 Meeting, Los Angeles, Calif. (Jan., 1987).

Shen, The Principles of Nonlinear Optics, pp. 187-192 (John Wiley and Sons 1984).
Yarviv and Yeh, Optical Waves in Crystals, pp. 333-336 (John Wiley and Sons 1984).
Yeh, Exact Solution of a Nonlinear Model of Two-Wave Mixing in Kerr Media, Journal of the Optical Society of America B, vol. 3, page 747 (1986).

*Primary Examiner*—Eugene R. Laroche
*Assistant Examiner*—Michael B. Shingleton
*Attorney, Agent, or Firm*—John J. Deinken; H. Fredrick Hamann

[57] ABSTRACT

An apparatus for steering a coherent input beam of electromagnetic energy includes an optically nonlinear medium for positioning in the path of the input beam. A source of acoustic energy generates acoustic waves in the nonlinear medium with a predetermined frequency and direction. The frequency and direction of the acoustic waves are selected to diffract a portion of the input beam as an output beam at a predetermined angle with respect to the input beam, interference between the input beam and the output beam initially causing an electrostrictive grating to form in the medium, with the grating subsequently causing additional energy to be transferred from the input beam to the output beam by stimulated Brillouin scattering.

13 Claims, 2 Drawing Sheets

KERR-BRAGG AGILE BEAM STEERING DEVICE

GOVERNMENT RIGHTS

The United States Government has rights in this invention pursuant to a contract awarded by the Department of the Navy.

BACKGROUND OF THE INVENTION

This invention is concerned with techniques for steering high energy laser beams.

Acousto-optic and electro-optic methods for steering a coherent optical beam are known in the art. Acousto-optic Bragg scattering, for example, is a well-known phenomenon and has been widely used for such applications as beam steering, beam modulation, and frequency shifting. The steering of a high energy laser beam over a large aperture is a difficult task, however, particularly for long wavelength lasers where acousto-optic or electro-optic devices are inefficient or impractical.

SUMMARY OF THE INVENTION

This invention enables a coherent laser beam to be coupled to a Bragg scattered beam using the Kerr effect, thereby enhancing the diffraction efficiency for the scattered beam and providing a means to efficiently steer a high power laser beam.

An apparatus for steering a coherent input beam of electromagnetic energy includes an optically nonlinear medium for positioning in the path of the input beam. A source of acoustic energy generates acoustic waves in the nonlinear medium with a predetermined frequency and direction. The frequency and direction of the acoustic waves are selected to diffract a portion of the input beam as an output beam at a predetermined angle with respect to the input beam, interference between the input beam and the output beam initially causing an electrostrictive grating to form in the medium, with the grating subsequently causing additional energy to be transferred from the input beam to the output beam by stimulated Brillouin scattering.

In a more particular embodiment, the source of acoustic energy is an array of acoustic transducers, with a control system connected to the array for causing the array to generate the acoustic waves with the predetermined frequency and direction.

In other more specific embodiments, the nonlinear medium may be a high pressure gas, a liquid, or an acousto-optic solid.

In addition, the source of acoustic energy may generate shear acoustic waves.

Another optional configuration involves placing the nonlinear medium within which the laser cavity in which the incoming beam is generated, or using the laser gain medium as the nonlinear medium. The apparatus may also be used to steer a beam in two dimensions, in which case there is a first source of acoustic energy for generating a first series of acoustic waves in a first acoustic direction in the nonlinear medium with a first predetermined frequency, the frequency and direction of the first series of waves being selected to diffract a portion of the input beam as a first output beam at a first predetermined angle with respect to the input beam, interference between the input beam and the first output beam initially causing a first electrostrictive grating to form in the medium, with the first grating subsequently causing additional energy to be transferred from the input beam to the first output beam by forward or backward stimulated Brillouin scattering. A second source of acoustic energy generates a second series of acoustic waves in a second acoustic direction perpendicular to the first acoustic direction in the nonlinear medium with a second predetermined frequency. The frequency and direction of the second series of waves are selected to diffract a portion of the first output beam at a second predetermined angle with respect to the first output beam, interference between the first output beam and the second output beam initially causing a second electrostrictive grating to form in the medium, with the second grating subsequently causing additional energy to be transferred from the first output beam to the second output beam by stimulated Brillouin scattering, thereby providing steering of the input beam in two dimensions.

A method of steering a coherent input beam of electromagnetic energy includes the steps of positioning an optically nonlinear medium in the path of the input beam and generating acoustic waves in the nonlinear medium. The frequency and direction of the acoustic waves are selected to diffract a portion of the input beam as an output beam at a predetermined angle with respect to the input beam, interference between the input beam and the output beam initially causing an electrostrictive grating to form in the medium, with the grating subsequently causing additional energy to be transferred from the input beam to the output beam by stimulated Brillouin scattering.

DESCRIPTION OF THE INVENTION

This invention provides a technique for steering a high energy laser beam, using a combination of conventional acousto-optic Bragg diffraction with nonlinear optical Kerr effects. The process utilizes stimulated scattering of the high power input beam from the nonlinear optical index gratings formed in a nonlinear medium.

Figure 1:
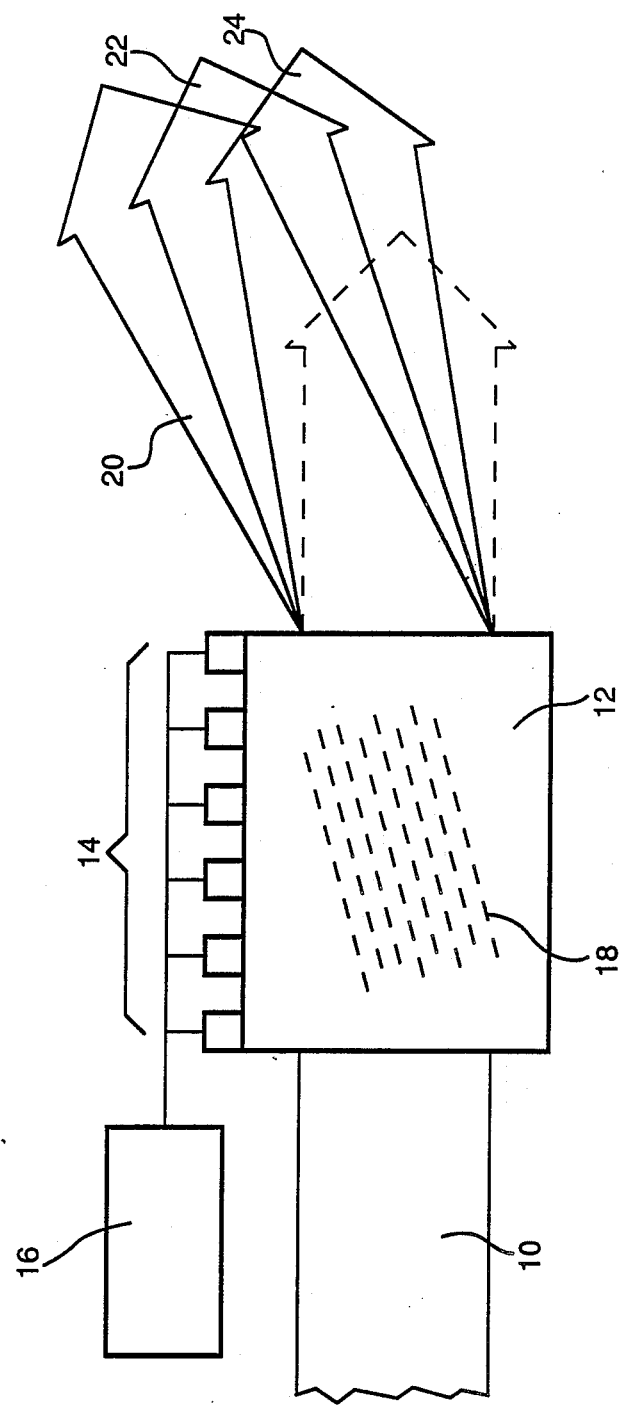
FIG. 1 is a cross-sectional diagram of an apparatus constructed according to the present invention for steering a coherent input beam of electromagnetic energy.

FIG. 1 is a cross-sectional diagram of an apparatus constructed according to the present invention for steering a coherent input beam of electromagnetic energy 10, such as a laser beam. An optically nonlinear medium 12 is positioned in the path of the input beam, while an array 14 of acoustic transducers is coupled to the nonlinear medium so that the array can generate acoustic waves 18 in the nonlinear medium. The array of transducers is driven by a control system 16 which is used to drive the individual transducers in the array in a phased manner so that the acoustic waves 18 can be made to propagate in the nonlinear medium with a predetermined frequency and direction. The frequency and direction of the acoustic waves are selected to diffract a portion of the input beam as an output beam 20 at a predetermined angle with respect to the input beam. Interference between the input beam 10 and the output beam 20 initially causes an electrostrictive grating to form in the medium 12. The grating subsequently causes additional energy to be transferred from the input beam to the output beam by forward or backward stimulated Brillouin scattering.

The process proceeds as follows. First, the acoustic waves 18 are launched with a frequency and direction selected such that the input beam 10 diffracts from the acousto-optic grating. Second, the Bragg diffracted beam 20 acts as a seed beam to form a travelling interference pattern with the input beam. Third, assuming that the power in the input beam is high enough, a second index grating forms by electrostrictive forces in the nonlinear medium, in response to the interference pattern. By virtue of the travelling nature of the intensity pattern in the nonlinear medium, the electrostrictive grating will be out of phase with the intensity pattern such that steady state energy transfer can occur from the input (pump) beam 10 to the Bragg diffracted output (seed) beam 20. Fourth, the seed beam will rapidly grow in intensity by stimulated Brillouin scattering of the pump beam 10 from the nonlinear index grating. This is the mechanism responsible for the energy exchange, which will continue until the input beam is completely depleted, or until the input or diffracted beam exits the interaction region. The net result of this process is that the high energy input beam is effectively diverted in the direction of the Bragg diffracted seed beam. The nonlinear index gratings thus act as "massless" mirrors that function as beam steering devices. Similar to conventional stimulated Brillouin scattering, the deflected beam will be frequency shifted with respect to the input laser beam. The difference is due to the acoustic phonons that are generated in the nonlinear medium by the electrostrictive process.

Control of the direction of the deflected beam can be accomplished by controlling the frequency and direction of the launched acoustic wave using, for example, a phased array of transducers. With a phased array of transducers, such as the array 14, the direction of the acoustic wave can be controlled by proper phasing of the array elements. Alternative output beams 22 and 24 indicate the control which is possible over the direction of the output beam by selecting the proper frequency and direction for the acoustic waves 18.

The amplitude of the acoustic waves 18 is not crucial, since the acoustic waves need only be strong enough to initiate the process. Even with a very weak acousto-optic interaction, the intensity of the Bragg diffracted wave will be many orders of magnitude higher than the acoustic noise which is responsible for triggering the conventional stimulated Brillouin scattering processes. Therefore, the threshold of operation for the Kerr-Bragg beam steering device of this invention is substantially lower than for conventional stimulated Brillouin scattering devices, assuming that the interaction length can be kept the same.

Interaction of high intensity light with a weak acoustic beam can be modeled by accounting for linear acousto-optic effects as well as the nonlinear effects which arise due to mixing of the input beam with the initially weak acousto-optically diffracted light. The nonlinear-optical process which enables this invention to operate can be analyzed using coupled-mode theory.

Consider the propagation of two optical plane waves in a Kerr medium. The electric field of the two waves may be written as (see Yeh, et al., Nonlinear-Optical Bragg Scattering in Kerr Media, Journal of the Optical Society of America B, Volume 4, Page 1954 (1987); Yeh, Exact Solution of a Nonlinear Model of Two-Wave Mixing in Kerr Media, Journal of the Optical Society of America B, Volume 3, Page 747 (1986)):

$$E_j = A_j \exp[i(\omega_j t - K_j \cdot r)], j=1, 2 \quad (1)$$

where the $\omega_j$'s are the frequencies and the $k_j$'s are the wave vectors for the two waves. In Equation (1) it is assumed for simplicity that both waves are s polarized and that the Kerr medium is isotropic. It is assumed further that no optical rotation is present in the medium. $A_1$ and $A_2$ are the amplitudes of the two waves and are considered as functions of the z direction only (where the z axis is normal to the surface of the medium) for a steady-state situation.

In a Kerr medium the two optical waves will generate an interference pattern, which in turn will induce a volume index grating in the medium. The fundamental components of the induced grating can be described as:

$$\Delta n = \tfrac{1}{2}\{n_2 e^{i\phi} A_1 A_2^* \exp[i(\Omega t - K \cdot r)] + c.c.\} \quad (2)$$

where $\phi$ and $n_2$ are real, $\Omega = \omega_1 - \omega_2$, $K = k_1 - k_2$, and c.c. designates the complex conjugate of the preceding expression. Here again, for the sake of simplicity, a scalar grating is assumed. The phase $\phi$ indicates the degree to which the index grating is temporally delayed (or spatially shifted) with respect to the interference pattern. $n_2 \exp(i\phi)$ may be regarded as a complex Kerr coefficient. Generally speaking, both $n_2$ and $\phi$ are functions of $\Omega$ and K. For media whose Kerr effect is dominated by electrostriction, such a complex Kerr coefficient can be written as (see, e.g., Kaiser, et al., Stimulated Rayleigh, Brillouin and Raman Spectroscopy, in Laser Handbook, Chapter E2 (Arecchi & Schulz-DuBois, eds., North-Holland, Amsterdam, 1972):

$$n_2 e^{i\phi} = \frac{-K^2 \gamma^2}{4n\rho\epsilon_0(\Omega^2 - v^2 K^2 - i\Omega\Gamma)} \quad (3)$$

where $\gamma$ is the electrostrictive coefficient, $v$ is the acoustic velocity, $\rho$ is the mass density, n is the index of refraction of the medium, $\epsilon_0$ is the dielectric constant of the vacuum, and $\Gamma$ is the inverse of the phonon lifetime.

Now, suppose that an acoustic field has been applied to the Kerr medium, such that the wave $A_2$ is generated by scattering of the wave $A_1$ from the applied sound wave. In this situation, the condition $\Omega = \pm vK$ is automatically satisfied, provided that wave $A_1$ is incident along a direction that satisfies the Bragg condition. Under these circumstances, the coupled-mode equations that govern the propagation of these two waves in the medium can be written as:

$$d/dz\, A_1 = -\tfrac{1}{2}g|A_2|^2 A_1 - ikA_2 \quad (4)$$

$$d/dz\, A_2 = -\tfrac{1}{2}g|A_1|^2 A_2 - ik^* A_1 \quad (4)$$

where k is the Bragg coupling constant, which is related to the initial strength of the acousto-optic interaction (i.e., the amplitude of the acoustic wave). g, the nonlinear gain term, is the Kerr intensity coupling constant. The coupled equations (4), which can be solved analytically with some approximations, show how the amplitudes of the input beam $A_1$ and the diffracted beam $A_2$ change as they travel through the nonlinear medium (taken to be direction z).

Figure 2:
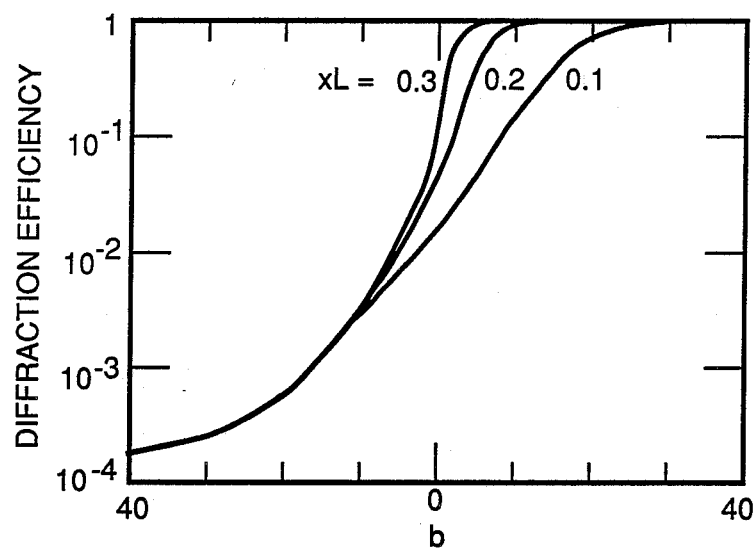
FIG. 2 graphically illustrates a theoretical prediction for the diffraction efficiency of this invention.

FIG. 2 graphically illustrates a theoretical prediction for the diffraction efficiency of this process. In FIG. 2, the diffraction efficiency is plotted as a function of a parameter b defined as:

$$b = gI/4K \qquad (5)$$

where I indicates the total intensity of light. As can be seen in FIG. 2, for positive values of b the diffraction efficiency can reach unity for any starting value of the acousto-optic interaction (shown in the figure in terms of the parameters L, where L is the total interaction length). The smaller the starting acousto-optic strength, the larger the value of b (i.e., the larger the required beam intensity) at which full diffraction occurs. Positive values of b refer to an acousto-optic interaction which downshifts the frequency of the diffracted laser beam. For negative values of b (i.e., an upshifted diffracted beam) the energy is actually extracted from the diffracted beam back to the incident beam.

The nonlinear material used for this invention can be a liquid (e.g., $CS_2$) or a gas (e.g., $SF_6$). Acousto-optic solids, such as quartz or $TeO_2$, can also be used in some circumstances, where the absorption effects are minimal and the solid can withstand the transmission of a high power laser beam. In the case of a solid, it is also possible to use shear acoustic waves to initiate the beam steering effect. This can result in polarization conversion of the deflected wave, which may be advantageous in some applications.

Another important property of this invention is that the selected nonlinear medium can be placed inside the laser cavity used to generate the input beam, or the laser medium can itself serve as the nonlinear medium as well. In other words, the steering process can be carried out intracavity by the injection of sound waves at appropriate angles. Since in most lasers (excluding unstable resonators) the intensity inside the lasing cavity is many times higher than outside, the stimulated Brillouin scattering process could be initiated much more efficiently in the latter embodiments.

In summary, the Kerr-Bragg beam steering device of this invention is particularly adapted for high power laser beams, especially for long wavelength lasers, where conventional acousto-optic or electro-optic steering techniques become very inefficient. A low power acoustic beam can be used to initiate the beam deflection, which then proceeds by stimulated Brillouin scattering processes. The steering technique of this invention exhibits a high spatial resolution (N>1000 spots per linear dimension). Deflection in two dimensions can be achieved by cascading two of the inventive steering devices. The deflection of the beam is effectively achieved from "mass-less" mirrors in the form of nonlinear index gratings. Random access for steering to any given target spot is possible by merely generating an acoustic wave in the nonlinear material with the appropriate frequency and direction. Access times are fast (approximately microseconds or less per millimeter of aperture). The steering technique of this invention can be applied to pulsed or continuous wave lasers. By virtue of the wave which the seed beam generates, the seed beam and the pump beam overlap automatically; moreover, the stimulated Brillouin scattering process is always phase matched. An additional advantage of the technique is that it is possible to tailor the shape of the acoustic wave profile to clean up the beam front of the deflected beam, and to compensate for a dirty pump beam.

The preferred embodiments of this invention have been illustrated and described above. Modifications and additional embodiments, however, will undoubtedly be apparent to those skilled in the art. While the device has been described with reference to its function of performing beam steering, for example, it also can act as a nonlinear optical element for discriminating against high power or high energy beams. This is because a low power beam will transmit through the device without being diffracted, while high power beams will be diverted. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference:

Kaiser, et al., Stimulated Rayleigh, Brillouin and Raman Spectroscopy, in Laser Handbook, Chapter E2 (Arecchi & Schulz-DuBois, eds., North-Holland, Amsterdam, 1972);

Yeh, Journal of the Optical Society of America B, Volume 3, Page 747 (1986).

Yeh, et al., Nonlinear-Optical Bragg Scattering in Kerr Media, Journal of the Optical Society of America B, Volume 4, Page 1954 (1987).

We claim:

1. An apparatus for steering a coherent input beam of electromagnetic energy, comprising:
   an optically nonlinear medium for positioning in the path of the input beam and
   a source of acoustic energy for generating acoustic waves in the nonlinear medium with a predetermined frequency and direction,
   the frequency and direction of the acoustic waves being selected to diffract and frequency downshift a portion of the input beam as an output beam at a predetermined angle with respect to the input beam, interference between the input beam and the output beam initially causing a nonlinear electrostrictive grating to form in the medium, with the grating subsequently causing additional energy to be transferred from the input beam to the output beam by nonlinear optical stimulated Brillouin scattering.

2. The apparatus of claim 1, wherein the source of acoustic energy further comprises:
   an array of acoustic transducers and
   a control system connected to the array for causing the array to generate the acoustic waves with the predetermined frequency and direction.

3. The apparatus of claim 1, wherein the nonlinear medium further comprises a high pressure gas.

4. The apparatus of claim 1, wherein the nonlinear medium further comprises a liquid.

5. The apparatus of claim 1, wherein the nonlinear medium further comprises an acousto-optic solid.

6. The apparatus of claim 5, wherein the source of acoustic energy further comprises a source of acoustic energy for generating shear acoustic waves.

7. The apparatus of claim 1, further comprising:
   a laser cavity and
   a gain medium in the cavity, within which the incoming beam is generated, the nonlinear medium being positioned within the laser cavity.

8. The apparatus of claim 1, wherein the nonlinear medium further comprises a laser gain medium within which the incoming beam is generated.

9. The apparatus of claim 1, wherein the source of acoustic energy further comprises:
   a first source of acoustic energy for generating a first series of acoustic waves in a first acoustic direction in the nonlinear medium with a first predetermined frequency,
   the frequency and direction of the first series of waves being selected to diffract and frequency downshift a portion of the input beam as a first output beam at a first predetermined angle with respect to the input beam, interference between the input beam and the first output beam initially causing a first nonlinear electrostrictive grating to form in the medium, with the first grating subsequently causing additional energy to be transferred from the input beam to the first output beam by forward or backward nonlinear optical stimulated Brillouin scattering,
   and further comprising:
   a second source of acoustic energy for generating a second series of acoustic waves in a second acoustic direction perpendicular to the first acoustic direction in the nonlinear medium with a second predetermined frequency,
   the frequency and direction of the second series of waves being selected to diffract and frequency downshift a portion of the first output beam at a second predetermined angle with respect to the first output beam, interference between the first output beam and the second output beam initially causing a second nonlinear electrostrictive grating to form in the medium, with the second grating subsequently causing additional energy to be transferred from the first output beam to the second output beam by nonlinear optical stimulated Brillouin scattering,
   thereby providing steering of the input beam in two dimensions.

10. A method of steering a coherent input beam of electromagnetic energy, comprising the steps of:
   positioning an optically nonlinear medium in the path of the input beam;
   generating acoustic waves in the nonlinear medium; and
   selecting the frequency and direction of the acoustic waves to diffract and frequency downshift a portion of the input beam as an output beam at a predetermined angle with respect to the input beam, interference between the input beam and the output beam initially causing a nonlinear electrostrictive grating to form in the medium, with the grating subsequently causing additional energy to be transferred from the input beam to the output beam by nonlinear optical stimulated Brillouin scattering.

11. The method of claim 10, wherein the step of generating acoustic waves further comprises generating shear acoustic waves in the nonlinear medium.

12. The method of claim 10, wherein the incoming beam is generated within a laser cavity, further comprising the step of:
   positioning the nonlinear medium within the laser cavity.

13. A method of steering a coherent input beam of electromagnetic energy in two dimensions, comprising the steps of:
   positioning an optically nonlinear medium in the path of the input beam;
   generating a first series of acoustic waves in the nonlinear medium;
   selecting the frequency and direction of the first acoustic waves to diffract and frequency downshift a portion of the input beam as a first output beam at a first predetermined angle with respect to the input beam, interference between the input beam and the first output beam initially causing a first nonlinear electrostrictive grating to form in the medium, with the first grating subsequently causing additional energy to be transferred from the input beam to the first output beam by forward or backward nonlinear optical stimulated Brillouin scattering;
   generating a second series of acoustic waves in the nonlinear medium;
   selecting the frequency and direction of the second acoustic waves to diffract and frequency downshift a portion of the first output beam at a second predetermined angle with respect to the first output beam, interference between the first output beam and the second output beam initially causing a second nonlinear electrostrictive grating to form in the medium, with the second grating subsequently causing additional energy to be transferred from the first output beam to the second output beam by nonlinear optical stimulated Brillouin scattering,
   thereby providing steering of the input beam in two dimensions.

* * * * *